United States Patent [19]

Mizutani et al.

[11] Patent Number: 4,795,532
[45] Date of Patent: Jan. 3, 1989

[54] AFTERTREATMENT METHOD AND APPARATUS FOR DISTILLED WATER

[75] Inventors: Junji Mizutani, Suita; Kozo Fujita, Nishinomiya, both of Japan

[73] Assignee: Sasakura Engineering Co. Ltd., Kobe, Japan

[21] Appl. No.: 15,524

[22] Filed: Feb. 13, 1987

Related U.S. Application Data

[63] Continuation of Ser. No. 702,913, Feb. 19, 1985, abandoned.

[51] Int. Cl.⁴ .................... B01D 3/10; C02F 1/20
[52] U.S. Cl. ........................................ 203/11; 203/7;
203/73; 203/92; 203/DIG. 14; 203/DIG. 17;
202/173; 202/174; 202/176; 202/202; 202/203;
202/205; 210/750; 261/DIG. 7; 417/68
[58] Field of Search .............. 203/7, 49, 4, 88, 29,
203/33, 36, 24, 26, DIG. 14, 11, 10, DIG. 17,
73, 91, 42, 95, 92; 210/750; 202/173, 174, 202,
203, 176; 159/DIG. 13, 17.1, 18, DIG. 40;
417/68, 69; 261/DIG. 7

[56] References Cited

U.S. PATENT DOCUMENTS

| | | | |
|---|---|---|---|
| 3,102,083 | 8/1963 | Adams | 417/69 |
| 3,218,241 | 11/1965 | Checkovich | 203/7 |
| 3,389,059 | 6/1968 | Gueldner | 203/7 |
| 3,875,988 | 4/1975 | Michida et al. | 159/18 |
| 3,956,072 | 5/1976 | Huse | 203/26 |
| 3,997,408 | 12/1976 | Barba et al. | 203/26 |
| 4,036,749 | 7/1977 | Anderson | 203/7 |
| 4,153,556 | 5/1979 | Riedinger | 210/750 |
| 4,222,825 | 9/1980 | Eisden | 203/11 |
| 4,366,066 | 12/1982 | Rogers et al. | 203/7 |

FOREIGN PATENT DOCUMENTS 0043872 4/1979 Japan .................. 203/7

Primary Examiner—Wilbur Bascomb
Attorney, Agent, or Firm—Marshall, O'Toole, Gerstein, Murray & Bicknell

[57] ABSTRACT

A method and apparatus for treating the distilled water obtained from an evaporation process sea water desalination plant is provided wherein carbon dioxide is extracted from sea water in the high temperature stages of the desalination plant and where the carbon dioxide thus extracted is dissolved into the water, along with calcium, thereby converting the distilled water into the quality suited for city tap water.

2 Claims, 1 Drawing Sheet

AFTERTREATMENT METHOD AND APPARATUS FOR DISTILLED WATER

This application is a continuation of application Ser. No. 702,913, filed Feb. 19, 1985, now abandoned.

BACKGROUND OF THE INVENTION

This invention relates generally to a method for treating the distilled water obtained from an evaporation process sea water desalination plant.

Typically, the distilled water obtained as a result of evaporation desalination processes is devoid of minerals, leading to the corrosion of water handling apparatus and lacking taste as drinking water. A solution to the problem has been to convert the distilled water to a more suitable quality by dissolving carbon dioxide and calcium carbonate or calcium hydroxide into the distilled water. The expense of obtaining the quantity of carbon dioxide necessary to treat the water has been a disadvantage, however.

Conventionally, carbon dioxide has been produced utilizing processes unrelated to that of the desalination plant by burning fuel oil or fuel gas. The enormous expense and running costs of such a separate facility are, however, prohibitive.

An improvement on the conventional method of producing carbon dioxide shown in Japanese Patent Provisional Publication No. 55-35971, makes use of the phenomenon that carbon dioxide is generated when acid such as hydrochloric or sulfuric is added to salt water. Before beginning the desalination process, acid is added to the salt water which is then fed into a decarbonator. Carbon dioxide is extracted from the decarbonator, which is at high vacuum (about −600 mmHg), with a vent ejector, requiring a large quantity of high pressure steam. The steam must then be condensed out, requiring a large quantity of cooling water. Although this method is an improvement over the conventional method of generating carbon dioxide in a completely separate process, the large quantities of steam and cooling water required by this method are disadvantageous. In addition, ammonia gas resulting from pyrolysis of hydrazine from the use of deoxidizers typically found in high pressure steam systems may ultimately contaminate, with unacceptable levels of ammonia nitrogen, the distilled water to which carbon dioxide generated from this method is added.

SUMMARY OF THE INVENTION

The present invention is an improved method for treating the distilled water obtained from an evaporation process desalination plant. The method utlizes the high temperature features of the desalination process itself to take advantage of the fact that sea water, because it contains carbonic acid, produces carbon dioxide when heated. This carbon dioxide is extracted and then dissolved in the distilled water produced by the plant.

BRIEF DESCRIPTION OF THE DRAWINGS

The features of this invention which are believed to be novel are set forth with particularity in the appended claims. The invention together with its further aspects and advantages thereof, may best be understood, however, by reference to the following description taken in conjunction with the accompanying drawings in which:

DETAILED DESCRIPTION OF THE DRAWINGS

Figure 1:
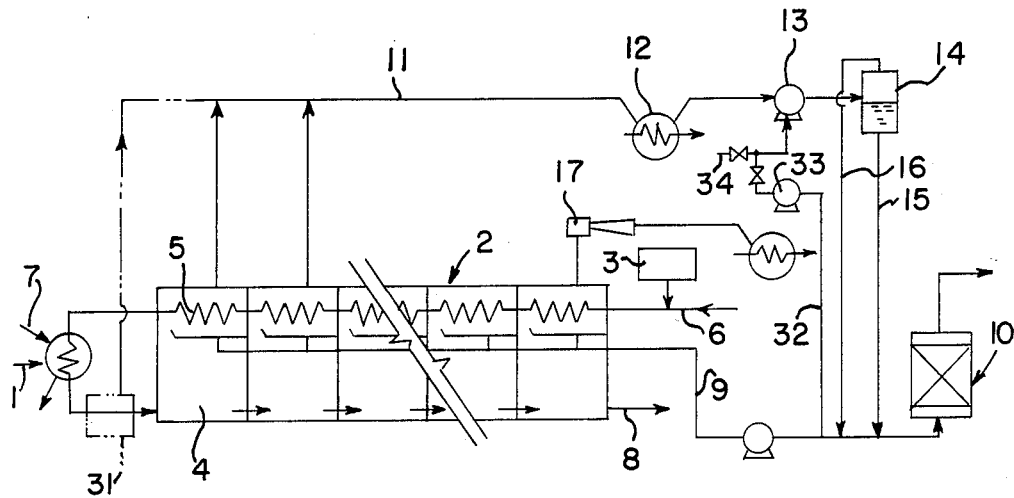
FIG. 1 is a flow diagram of the claimed method as applied to a conventionally known multiple-stage flash type sea water desalination process.

FIG. 1 shows a flow diagram of one of the claimed method as applied to a conventionally known multiple-stage flash type sea water desalination plant.

This equipment is composed of brine heater 1, multiple evaporation chambers 2, and antiscale agent feeder 3. An evaporation stage 4 and condenser 5 are attached to each one of the evaporation chambers 2.

Sea water is supplied into the system through a pipe 6, and an antiscale agent is added through the antiscale agent feeder 3. Antiscale agents, such as poly-phosphate, inhibit scale formation during the evaporation process. The sea water then flows sequentially from the low temperature evaporation stage to high temperature evaporation stage within the tube of the condenser 5 of each evaporation chamber 2, the sea water being heated gradually by the vapor generated of each evaporation stage. The sea water is further heated in the brine heater 1 by the high temperature steam sent in from, for example, a boiler through the pipe 7. The sea water is then supplied into the high temperature evaporation stage in the evaporation chambers 2 for flash evaporation. The flash evaporation process is repeated thereafter until the unevaporated portion of the sea water is discharged out of the system through a pipe 8 from the final low temperature evaporation stage.

The inside of each evaporation chamber 2 is maintained at a specified degree of vacuum by the vacuum equipment such as steam ejector 17 connected to the low temperature evaporation chamber, whereas the pressure in the high temperature evaporation chamber is close to or higher than atmospheric pressure.

The vapor generated in each evaporation stage is condensed outside the tube of the condenser 5 to become distilled water, which is discharged out of the system into calcium carbonate dissolving equipment 10 through a pipe 9.

During the evaporation process, a huge volume of carbon dioxide is produced in high temperature evaporation chambers 2 due to high temperature of the sea water in these chambers. This result is obtained because sea water contains carbonic acid, typically 140 ppm, as biocarbonate (HCO3—) ions which, when heated, decompose to produce carbon dioxide (CO2) as follows:

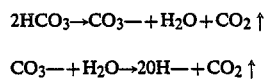

The output of carbon dioxide increases in proportion to the temperature of the sea water.

The carbon dioxide thus produced is extracted together with other noncondensing gases from a tube 11. After removal of condensate in the condenser 12, the carbon dioxide is compressed in a water-sealed compressor 13 and sent into a separator 14. The mixture is separated into gases containing carbon dioxide and sealing water in which some carbon dioxide will be dissolved. Gases containing carbon dioxide and the sealing water in which carbon dioxide is dissolved are supplied into a delivery pipe 9 of the distilled water through pipes 15 and 16.

The sealing water of the water-sealed compressor 13 may be supplied with distilled water through pipe 32, upstream of the introduction of carbon dioxide into the distilled water through pipes 15 and 16. However, fresh water may instead be used as sealing water and may be supplied by changing over through pipe 34.

Because the pressure in the high temperature evaporation chambers is close to or higher than atmospheric pressure, and because the concentration of the carbon dioxide generated in the high temperature evaporation chambers is high, a vent ejector for generating high vacuum is not particularly needed to extract the noncondensing gases including carbon dioxide from these evaporation chambers. If a vent ejector is used, a small one requiring little steam consumption is sufficient.

Because the volume of carbon dioxide produced by eating the sea water suddenly increases when exceeding 60° C., it is preferable to keep the temperature of evaporating chambers from which carbon dioxide is extracted above 60° C.

When feeding the sealing water and gases containing carbon dioxide from the separator 14 into the delivery pipe 9 of the distilled water, it is preferable to supply the selling water from the separator 14 through the pipe 15 downstream of the supply of the gases containing carbon dioxide through the pipe 16. If reversed, the dissolving volume of carbon dioxide gas into the distilled water would be lowered due to the presence of carbon dioxide supplied from the carbon dioxide dissolved in the sealing water.

when dissolving calcium into the distilled water, using calcium carbonate, calcium hydroxide or slaked lime, the dissolving quantity of calcium may be increased by providing the dissolving equipment 10 downstream of the supply points of the carbon dioxide through pipes 15 and 16.

Figure 2:
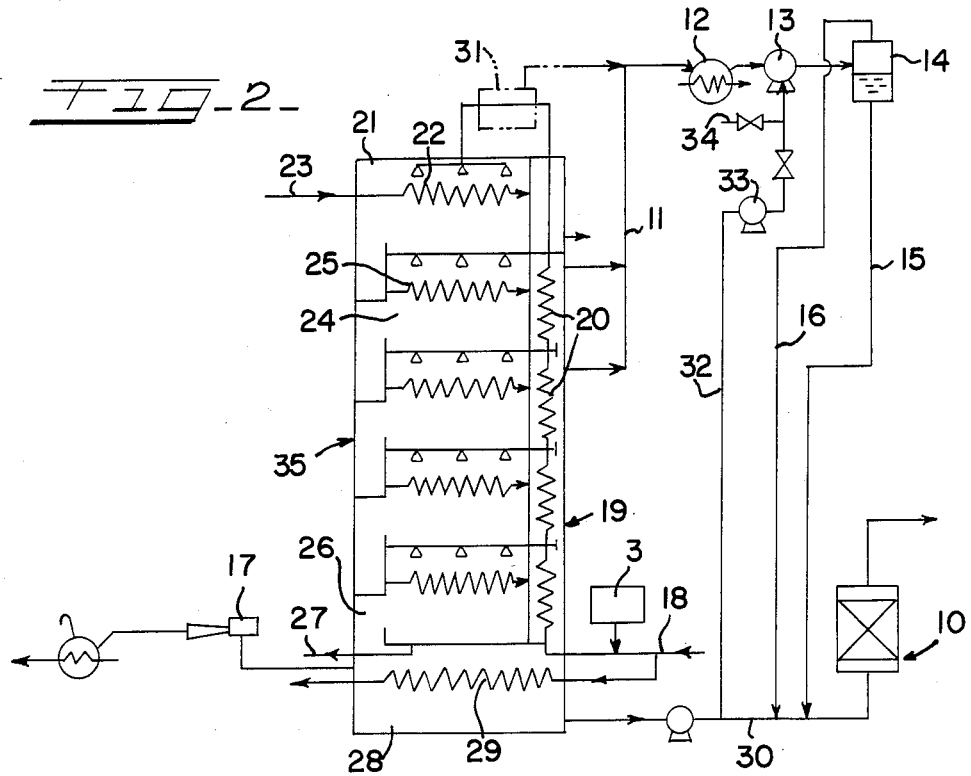
FIG. 2 is a flow diagram of the claimed method as applied to a conventionally known multiple-effect type sea water desalination process.

FIG. 2 shows a flow diagram of the claimed method as applied to a conventional multiple-effect type sea water desalination plant.

Sea water is supplied into the system through pipe 18, and an antiscale agent is added through the anti-scale agent feeder 3. The sea water flows from low temperature stage to high temperature stage sequentially within the tubes in the preheater 20 of evaporation chamber 35 while being heated. The heated sea water is sprayed over the outer surface of the heating tube 22 of the first effect evaporator 21, which is then evaporated by the heat provided from the steam supplied into the heating tube 22 through pipe 23. The remaining unevaporated sea water is sprayed over the outer surface of the heating tube 25 of the second effect evaporator 24. In a similar manner, the remaining unevaporated sea water is supplied into lower stages of the effect evaporator and is discharged out of the system through a pipe 27 from the final effect evaporator 26.

The vapor generated in the first effect evaporator 21 is supplied into the heating tube of the second effect evaporator 24, and is condensed as the cooler sea water is sprayed over the outer surface of the heating tube 25. Thereafter, the same action is repeated sequentially in each effect evaporator until the steam generated in the final effect evaporator 26 is cooled and condensed in a condenser 28 by the sea water flowing in the cooling tube 29 of the condenser 28. This condensate, combined with the condensate from the heating tubes from previous effect evaporators, is discharged out of the system as the intended d1stilled water from the delivery pipe 30 which is then fed through the calcium carbonate dissolving equipment 10.

Carbon dioxide is extracted through tube 11 together with noncondensing gases from the effect evaporators at which the temperature of sea water is higher than 60° C., such as the first and second effect evaporators 21 and 24. Atter condensing and removing moisture with the condensor 12, the carbon dioxide is compressed by compressor 13 of the same water sealing type dicussed under FIG. 1. The mixture is then supplied into the separator 14. The resulting carbon dioxide gas and sealing water containing dissolved carbon dioxide is supplied into the distilled water delivery pipe 30 through the pipes 15 and 16.

The method as described above shows the extraction of carbon dioxide from the high temperature evaporation stages of the desalination process. As an alternative, a gas separator 31 indicated by chain lines may be disposed at the downstream side of the brine heater 11 in the multiple-stage flash type desalination plant shown in FIG. 1 or at the downstream side of the preheater 20 in the multiple-effect type desalination plant shown in FIG. 2. Thus, carbon dioxide may be separate together with other noncondensing gases, from the high temperature sea water in this gas separator 31. The carbon dioxide may then be supplied through the pipe 11. When carbon dioxide is separated from the high temperature sea water before its entry into the evaporation chamber in high temperature stage, the load on the vacuum equipment for keeping the evaporation chamber in vacuum state may be lessened advantageously.

Since carbon dioxide at high concentration is produced in the high temperature stages of the sea water in the desalination plant, it can be extracted without a high vacuum. Thus, the diameter of the piping for feeding the carbon dioxide into the distilled water may be reduced, and the vent ejector employed in the prior art which consumes a huge volume of steam for extraction is not particularly required. Nor is an enclosed type decarbonator required. As a result, the facility may be downsized at reduced cost, and the running cost may be greatly saved at the same time. If such a vent ejector is used, a small one consuming little steam is sufficient, with the benefit that the quantity of ammonia gas in the steam will not ultimately contaminate the distilled water.

Carbon dioxide generated at high temperature positions of the saltwater is compressed by a water-sealed compressor, and is supplied into the distilled water together with the compressor sealing water. This is a further advantage of the claimed method because, when compressing in the water-sealed compressor, carbon dioxide can be sufficiently dissolved in the sealing water in the compressor, thus the ultimate dissolving volume of the carbon dioxide in the distilled water is increased.

Since boiler steam is not necessary to extract the carbon dioxide, ammonia gas contamination of the distilled water is not a problem.

We claim:

1. A method of treating water distilled from sea water by a distillation system having a plurality of evaporation stages, each of which is adapted to produce water vapor and carbon dioxide gas by evaporating sea water and produce distillate by condensing water vapor, said method comprising the steps of:

removing said distillate from said system, removing said gas from at least one of said stages, the temperature of which exceeds 60° C., compressing said removed gas in a water-sealed compressor, thereby creating a mixture of sealing water and carbon dioxide, separating said mixture in a separator into carbon dioxide gas and sealing water in which carbon dioxide is dissolved, adding said gas from said separator to said removed distillate, and adding said sealing water from said separator to said distillate after said step of adding said gas.

2. Apparatus for treating water distilled from sea water by a distillation system having a plurality of evaporation stages, each of which is adapted to produce water vapor and carbon dioxide gas by evaporating sea water and produce distillate by condensing water vapor, said apparatus comprising:

a distillate pipe connected to said system to remove said distillate, a water-sealed compressor connected to at least one of said stages, the temperature of which exceeds 60° C., to evacuate said gas, said compressor being operable to compress said gas thereby creating a mixture of sealing water and carbon dioxide, a separator connected to said compressor to separate said mixture into carbon dioxide gas and sealing water in which carbon dioxide is dissolved, means connecting said separator to said distillate pipe to add said gas from said separator to said distillate, and means connecting said separator to said distillate pipe to add said sealing water from said separator to said distillate at a point downstream from where said gas is added.

* * * * *